United States Patent
Matsuki et al.

(10) Patent No.: US 6,787,077 B2
(45) Date of Patent: Sep. 7, 2004

(54) CELLULAR MOLDED ARTICLE IN MOLD PATTERN HAVING SURFACE SKIN AND PRODUCING METHOD THEREOF

(75) Inventors: Kiyoshi Matsuki, Nishinomiya (JP); Kaoru Yaguchi, Ibaragi (JP)

(73) Assignee: Kaneka Corporation, Osaki (JP)

( * ) Notice: Subject to any disclaimer, the term of this patent is extended or adjusted under 35 U.S.C. 154(b) by 58 days.

(21) Appl. No.: 09/950,699

(22) Filed: Sep. 13, 2001

(65) Prior Publication Data

US 2002/0146554 A1 Oct. 10, 2002

(30) Foreign Application Priority Data

Jan. 25, 2001 (JP) .......................................... 2001-016528

(51) Int. Cl.[7] .............................................. B29C 44/06
(52) U.S. Cl. ..................... 264/45.4; 264/46.4; 264/129; 264/293
(58) Field of Search ............................. 264/45.4, 46.4, 264/129, 293

(56) References Cited

U.S. PATENT DOCUMENTS 5,795,526 A * 8/1998 Matsumoto et al. ........ 264/266

FOREIGN PATENT DOCUMENTS

| EP | 0 960 719 | * 12/1999 |
| JP | 11-221870 | 8/1999 |

* cited by examiner

Primary Examiner—Allan R. Kuhns
(74) Attorney, Agent, or Firm—Armstrong, Kratz, Quintos, Hanson & Brooks, LLP

(57) ABSTRACT

A cellular molded article in a mold pattern having a surface skin, which has an excellent releasing property from a metal mold as well as an excellent printing property of a design formed on a surface of the metal mold, and a producing method thereof are provided. The cellular molded article in a mold pattern having the surface skin and a producing method thereof, in which, at least a face of the surface skin material, which contacts the metal mold, is an olefin thermoplastic elastomer sheet which is composed of an olefin resin without containing a polyethylene resin as its matrix, and pre-expanded beads, which are employed for an expansion molding in a mold pattern, are pre-expanded beads of an olefin resin.

8 Claims, 8 Drawing Sheets

CELLULAR MOLDED ARTICLE IN MOLD PATTERN HAVING SURFACE SKIN AND PRODUCING METHOD THEREOF

TECHNICAL FIELD

This invention relates to a cellular molded article in a mold pattern having a surface skin, which is used for such as the interior trim material of an automobile, and a producing method thereof.

BACKGROUND OF THE INVENTION

As a conventional producing method of a cellular molded article having a surface skin in this kind, it is known as a so-called simultaneous unification molding to one piece that, for example, on either one of two metal molds by which a mold pattern is formed, a surface skin material of thermoplastic resin is arranged, and after clamping the metal molds, pre-expanded beads are fed into this mold pattern, then the pre-expanded beads are expanded and melt united each other by steam heating, and at the same time, these pre-expanded beads and the above mentioned surface skin material of thermoplastic resin are melt united together to one piece.

In this simultaneous unification molding to one piece, in each inside of the above mentioned two metal molds, a chamber connected with a steam valve, a decompression valve and such others are provided. And, on the one metal mold to which the above mentioned surface skin material will be arranged, a plural number of decompression holes which connect with the above mentioned chamber are provided, at the same time, on the other metal mold, a plural number of decompression holes which connect with the above mentioned chamber are provided. And, at a time of the above mentioned expansion molding, by means of supplying steam into the mold pattern from the steam holes on the above mentioned other metal mold, the filled pre-expanded beads in this mold pattern are heat expanded.

In this step, in order to make an effective expansion molding by pre-heating the above mentioned surface skin material, before arranging this surface skin material, by means of supplying steam into the above mentioned chamber, the above mentioned other metal mold is often pre-heated.

However, in a case of preheating the above mentioned one metal mold as in the above, if an olefin thermoplastic resin elastomer is employed as the above mentioned surface skin material, after molding it, at a time of mold releasing of the cellular molded article in the mold pattern having the surface skin from the above mentioned one metal mold, the above mentioned surface skin material will stick on the above mentioned one metal mold, and therefore it will often cause a hard release from the above mentioned one metal mold.

Usually, before releasing it, it is cooled down by water or the like, but it will not be sufficient. While, a long time cooling is not preferable due to a longer producing cycle.

At a time of releasing the cellular molded article in the mold pattern having the surface skin after the end of molding, if the above mentioned surface skin material sticks on the metal mold as in the above, an automatic releasing of the molded article from the molding machine becomes hard, subsequently, it will raise its production cost by a longer time of molding cycle, or by addition of equipment, tools or the like for releasing the molded article from the molding machine. Furthermore, as releasing the stuck molded article by force from the face of metal mold, there is a problem that design of the surface skin will be deteriorated.

SUMMARY OF THE INVENTION

This invention is to solve the above mentioned problems, and even in a case of preheating the above mentioned one metal mold, sticking the surface skin material on the above mentioned one metal mold will practically not be appeared, and therefore, it is an object to provide a producing method of the cellular molded article in the mold pattern having the surface skin and a molded article thereby, which are free from problems of the molding operation.

DISCLOSURE OF THE INVENTION

To achieve the above mentioned object, an essential feature residing in the invention which is claimed is that, a measure for producing method of the cellular molded article in the mold pattern having a surface skin is that, a producing method which is, after thermoforming of a surface skin material along by a metal mold face of either one of two metal molds which compose a mold pattern, by means of expansion molding in this mold pattern, the above mentioned surface skin material is melt united to one piece with a surface of cellular molded article in the mold pattern to be molded, and at least a face of the above mentioned surface skin material, which contacts with a metal mold, is an olefin thermoplastic elastomer sheet which is composed of an olefin resin without containing a polyethylene resin as its matrix, and pre-expanded beads, which are employed for an expansion molding in the mold pattern, are pre-expanded beads of an olefin resin.

An essential feature residing the invention which is claimed is that, a measure that at least a face of the above mentioned surface skin material contacting with a metal mold is composed of a domain, which contains a polyethylene resin as its composing raw material resin and is formed by dynamic curing, and an olefin thermoplastic elastomer sheet which is composed of an olefin resin without containing a polyethylene resin as a matrix, and pre-expanded beads to be employed for an expansion molding in the mold pattern are pre-expanded beads of an olefin resin.

An essential feature residing in the invention which is claimed is that, a measure is that the above mentioned olefin pre-expanded beads are pre-expanded beads of a propylene resin.

An essential feature residing in the invention which is claimed is that, a measure is that the above mentioned olefin pre-expanded beads are pre-expanded beads of a polyethylene resin.

An essential feature residing in the invention which is claimed is that, a measure is that the above mentioned olefin resin as a matrix is a polypropylene resin.

An essential feature residing in the invention which is claimed is that, a measure is that the above mentioned polyethylene resin which is not included as a matrix is a linear low density polyethylene resin.

An essential feature residing in the invention which is claimed is that, a measure is that at least the one metal mold is composed of an aluminum metal.

An essential feature residing in the invention which is claimed is that on the surface of the above mentioned one metal mold, a design pattern, which will be printed on a sheet at a time of thermal forming of the sheet, is attached.

An essential feature residing in the invention which is claimed is that, a measure for the cellular molded article in the mold pattern having the surface skin which is prepared by that, after thermo-forming of a surface skin material along by either one of metal mold face of two metal molds which compose a mold pattern, by means of expansion molding in this mold pattern, the above mentioned surface skin material is melt united to one piece with a surface of cellular molded article to be molded, and at least one face of the above mentioned surface skin material which contacts with a metal mold is composed of an olefin thermoplastic elastomer sheet which is composed of an olefin resin without containing a polyethylene resin as a matrix, and pre-expanded beads which will be employed for an expansion molding in the mold pattern are pre-expanded beads of an olefin resin.

An essential feature residing in the invention which is claimed is that, a measure for the cellular molded article in the mold pattern having the surface skin is that, at least one face of the above mentioned surface skin material which contacts with a metal mold is an olefin thermoplastic elastomer sheet composed of an olefin resin without containing a polyethylene resin, and pre-expanded beads, which will be employed for an expansion molding in the mold pattern, are pre-expanded beads of an olefin resin.

An essential feature residing in the invention which is claimed is that, a measure for the interior trim material of ion automobile comprises the cellular molded article in the mold pattern having the surface skin which is claimed.

An essential feature residing in the invention which is claimed is that, a measure for the cellular molded article in the mold pattern having the surface skin is that pre-expanded beads of the above mentioned olefin resin are pre-expanded beads of a polypropylene resin.

An essential feature residing in the invention which is claimed is that, a measure for the cellular molded article in the mold pattern having the surface skin is that pre-expanded beads of the above mentioned olefin resin are pre-expanded beads of a polyethylene resin.

An essential feature residing in the invention which is claimed is that, a measure for the cellular molded article in the mold pattern having the surface skin is that the above mentioned olefin resin as a matrix is a polypropylene resin.

An essential feature residing in the invention which is claimed is that, a measure for the cellular molded article in the mold pattern having the surface skin is that the above mentioned polyethylene resin which is not included as a matrix is a ar low density polyethylene resin.

BRIEF DESCRIPTION OF THE DRAWINGS

For the better understanding of the invention as well as other objects and features thereof, reference is made to the following detailed description to be read in conjunction with the accompanying drawings, wherein.

Figure 1:
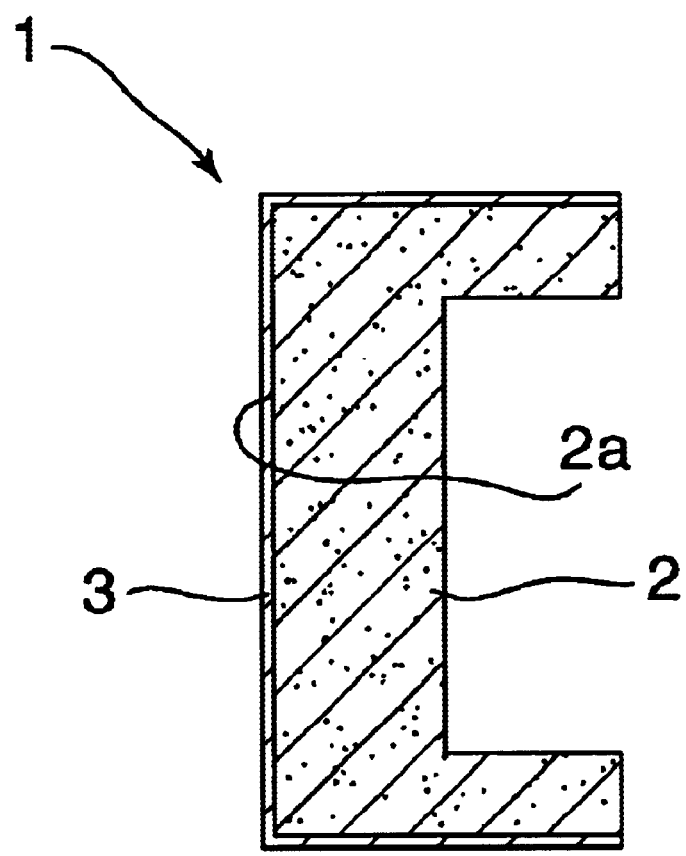
FIG. 1 illustrates a sectional side view of the cellular molded article in the mold pattern having the surface skin of a polyolefin resin.

In the above mentioned drawings, marks represent as follows;

1 cellular molded article in the mold pattern having the surface skin of a polyolefin resin
2 cellular molded article of a polyolefin resin
3 TPO surface material
4 mold pattern
5 the one metal mold
6 the other metal mold
7 inside of the mold pattern
8 pre-expanded beads of a polyolefin resin
13 thermoplastic surface skin material for outer layer

BEST MODE FOR PRACTICING THE INVENTION

Embodiments of this invention are described below based on the attached drawings. As illustrated in FIG. 1, the cellular molded article in the mold pattern having the surface skin of a polyolefin resin 1 comprises the cellular molded article in the mold pattern of a polyolefin resin 2, which is formed to such as U-shape in sectional side view, and TPO (olefin thermoplastic elastomer) surface skin material 3, which is melt united to one piece with surface 2a of said cellular molded article in the mold pattern of a polyolefin resin.

The above mentioned cellular molded article in the mold pattern of polyolefin resin 2 is a molded article by expansion molding in the mold pattern of pre-expanded beads of a polyolefin resin pre-expanded beads. As the above mentioned polyolefin resin, for example, low density polyethylene, medium density polyethylene, high density polyethylene, ar low density polyethylene, ethylene-vinyl acetate copolymer, propylene homopolymer, ethylene-propylene random copolymer, ethylene-propylene-butene random terpolymer, propylene-vinyl chloride copolymer, propylene-butene copolymer, propylene-maleic anhydride copolymer, and polyethylene resin or polypropylene resin of poly(butene-1) or the like can be mentioned among others, and these can be used alone or as a mixture of not less than two of them.

This polyolefin resin is preferably not cross linked however, it may also be cross-linked by using a peroxide, radiation or the like.

Furthermore, a mixture of this polyolefin resin and other thermoplastic resin can be employed. As such kind of thermoplastic resin, in a case of blending with the above mentioned polypropylene resin, for example, low density polyethylene, ar low density polyethylene, aromatic vinyl polymer, polybutene, and ionomer can be mentioned among others. While, in case of blending with the above mentioned polyethylene resin, for example, aromatic vinyl polymer, polybutene and ionomer can be mentioned among others.

And in these cases, as an amount of the thermoplastic resin to be blended with is preferably not more than 20 parts by weight against 100 parts by weight of a polyolefin resin, more preferably 5 to 10 parts by weight.

The above mentioned pre-expanded beads of polyolefin resin 8 can be produced for example by a process that a polyolefin resin as in the above is molded to pellet shape in advance, this polyolefin resin pellet is made to be impregnated with a volatile foaming agent in an autoclave and then is dispersed in water in keeping stirring, and after heating it up until a prescribed foaming temperature, by means that this dispersed pellet in water is released into a low pressure zone, and thus, it is produced in a pre-expanded state.

As an expansion rate when these pre-expanded beads of a polyolefin resin 8 are expanded in the mold pattern, in a case of less than 3 times, buffer property or the like of an obtained cellular molded article in the mold pattern of polyolefin resin 2 tends to be reduced, while in a case of more than 60 times, shrinkage of cellular molded article in the mold pattern of a polyolefin resin 2 becomes too large and also its strength or the like becomes low due to excessive softness, therefore, it is desirable 3 to 60 times, preferably 5 to 50 times, more preferably 8 to 45 times, and most preferably 10 to 35 times. As such pre-expanded beads of a polyolefin resin 8, for example, Eperan PP (trade name, made by Kanegafuchi Chemical Industry, Co. expansion rate is 15 times) can be suitably employed among others.

An olefin copolymer rubber which is employed as the above mentioned TPO surface skin material (olefin thermoplastic elastomer) 3 is a non-regular type random elastic copolymer with an olefin as its main component, which is, for example, ethylene-propylene copolymer rubber, ethylene-propylene-nonconjugated diene rubber, ethylene-butene-nonconjugated diene rubber, or propylene-butadiene copolymer rubber can be mentioned among others. Among these, an ethylene-propylene-nonconjugated diene rubber is particularly preferable. As a nonconjugated diene, dicyclopentadiene, 1,4-hexadiene, cyclooctadiene, methylene norbornane, ethylidene norbornane can be mentioned among others.

An olefin copolymer rubber is usually cross linked, and a suitable elasticity is caused by this. Therefore, if a cross linking by a peroxide or a radiation works effectively, such method will not be limited whatsoever.

A preferable olefin resin, which is employed for the above mentioned TPO surface skin material (olefin thermoplastic elastomer) 3, is a polypropylene resin, and as a preferable said polypropylene resin, a polypropylene and/or a random or block copolymer resin of propylene and α-olefin having two or more carbon atoms. As a typical example of α-olefin having two or more carbon atoms, ethylene, 1-butene, 1-pentene, 3-methyl-1-butene, 1-hexene, 1-decene, 3-methyl-1-pentene, 4-methyl-1-pentene or 1-octene can be mentioned among others.

In the present invention, an olefin resin as in this description is preferably excluding a polyethylene resin, and even if a polyethylene polymer is included, the minimum amount of it can improve its releasing property from a mold pattern. The reason of this property is not cleared yet, but it is thought that, because of a low softening temperature of polyethylene resin, this resin sticks on a metal mold, and thus, its releasing property gets worse. From the above assumption, for example, in a case of 100% by weight of olefin resin, blending amount of a polyethylene polymer is not more than 15% by weight, preferably not more than 5% by weight, and more preferably not more than 1% by weight. The most preferably, it should be reduced further however, as long as achieving an object of the present invention, it is not limited to these.

That is, in the present invention, an olefin resin without containing a polyethylene resin as a matrix is described as in the above definition. TPO surface skin material 3 comprises the above mentioned olefin copolymer rubber (domain) and an olefin resin (matrix), and a ratio of each of them can be determined or selected by one's discretion according to its object. And as a cross linking agent, which makes a partial cross linking of the above mentioned each mixture, in general, an organic peroxide is suitably employed.

In a producing method of the above mentioned TPO surface skin material, if necessary, an auxiliary agent such as cross linking auxiliary agent, flow promoter, inorganic filler, antioxidant, weather-proof agent, anti-static agent, pigment can be blended therewith.

Furthermore, as a coating material for scratch protection, which comprises a thermoplastic elastomer and which is coated on the sheet surface, it is preferably an urethane or acrylic coating material.

As a processing method of a laminated surface skin material in which such material is employed, it can be mentioned among others that, during a processing or after the processing of sheet molding by a method of calendar molding or T-die extrusion molding of a thermoplastic elastomer according to the above mentioned method or the like, a resinous cellular article layer is laminated, and then, in its lower stream process, a coating material is coated on a surface of thermoplastic elastomer which will be the utmost outer layer by a coating machine such as gravure coater.

Next, a producing method of the cellular molded article in the mold pattern having the surface skin of polyolefin resin 1 will be explained. As illustrated in FIG. 2 to FIG. 7 inclusive, a producing method of the cellular molded article in the mold pattern having the surface skin of olefin resin 1, which is relating to this embodiment of the present invention, is that on the one metal mold 5 of two metal molds 5 and 6, which compose mold pattern 4, TPO surface skin material 3 is arranged and clamped them, after then pre-expanded beads of a polyolefin resin 8 are fed into this mold pattern 7, and, by means of steam heating, these pre-expanded beads of a polyolefin resin 8 are expanded to make melt uniting together, and at the same time, these pre-expanded beads of a polyolefin resin 8 are melt united to one piece with the above mentioned TPO surface skin material 3.

Figure 2:
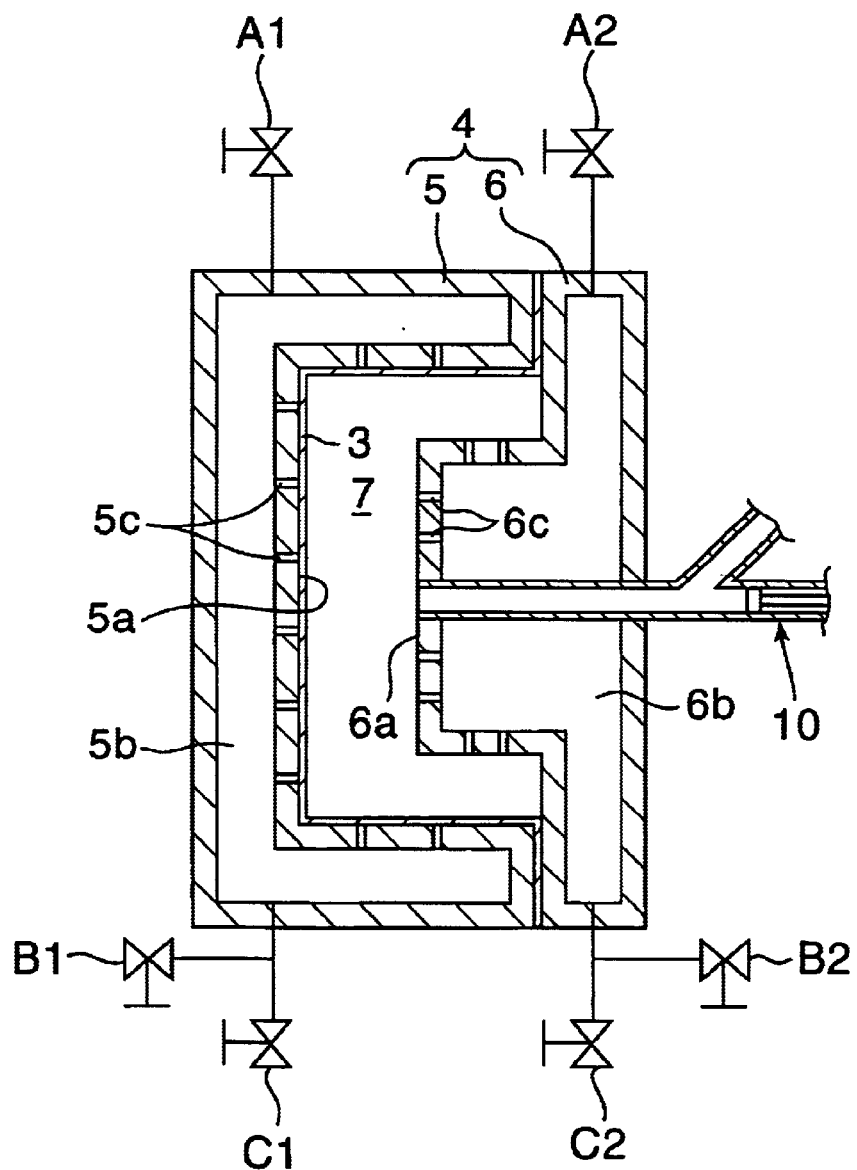
FIG. 2 illustrates a sectional side explanation view that, in a producing method of cellular molded article in the mold pattern having the surface skin of polyolefin resin, it is shown a state that a TFO surface skin material is arranged on the surface of the one metal mold and then clamped.

That is, as illustrated in FIG. 2, the above mentioned TPO surface skin material 3 is arranged on the above mentioned one metal mold 5, and then the mold pattern is clamped.

At this stage, the above mentioned mold pattern 4 is, for example, composed of two metal molds 5 and 6, which are capable to clamp and open in vertical direction.

In these two metal molds 5 and 6, the above mentioned one metal mold 5 is, for example, composed of a concave shape in sectional side view, and chamber 5b is formed in its inside, and a plural number of decompression holes 5c, which are connected with the above mentioned chamber 5b, are formed on its surface 5a side. And, the above mentioned chamber 5b is connected with a steam valve A1, a decompression valve B1 and a drain valve C1 respectively. The other metal mold 6a is, for example, composed of a convex shape in sectional side view, and chamber 6b is formed in its inside, and a plural number of steam holes 6c, which are connected with the above mentioned chamber 6b, are formed on its surface 6a side. And, the above mentioned chamber 6b is connected with a steam valve A2, a decompression valve B2 and a drain valve C2 respectively, and feeder 10 for feeding pre-expanded beads of polyolefin resin 8 into the above mentioned mold pattern 7 is provided.

Arranging the above mentioned TPO surface skin material 3 on surface 5a of the one metal mold 5 may be made by that the above mentioned TPO surface skin material 3 is formed in advance to a suitable shape to conform to surface 5a shape of the above mentioned one metal mold 5 by such as vacuum forming, however, as is in this embodiment, in a case of arranging it by heat forming such as vacuum forming, there is a merit that the labor for forming it in advance can be omitted. And, as a thermo-forming of this TPO surface skin material 3, it is not limited to vacuum forming but other forming such as compression molding can be applied.

At this stage, as a method for vacuum forming, the above mentioned TPO surface skin material 3 is heat-softened beforehand, and it is contacted with the one metal mold 5 as it is, thereafter decompression valve B1, which is connected with the above mentioned chamber 5b, is opened or like that.

In this case, by means that the above mentioned one metal mold 5 is heated up to a prescribed temperature by steam or a heater which is separately mounted on or the like, temperature drop of heat-softened TPO surface skin material 3 to be contacted with said the one metal mold 5 can be minimized, thus there is a merit that a design pattern of the one metal mold 5 can be effectively printed on TPO surface skin material 3. Further, during the heat molding or in the subsequent expansion molding in the mold pattern, in order to prevent a heat drop of TPO surface skin material 3, heating up by such as a heater may continue during the thermo-forming or even in after it, or a stepwise heating which is changing the setting temperature in stepwise from the beginning may also be done.

And, in a case that thie above mentioned TPO surface skin material 3 comprises a polyolefin resin, when the temperature of the one metal mold 5 before the thermo-forming operation is at in a range of 60 to 150° C., preferably at 60 to 130° C., more preferably at 70 to 120° C., as the above mentioned TPO surface skin material 3 can be thermoformed in a suitable softening condition, there is a merit to make a good finishing.

While, in a case that the cellular molded article in the mold pattern having the surface skin of a polyolefin resin 1 to be obtained by this process is, for example, required to have a fitting tool or the like, on surface 6a of the above mentioned other metal mold 6, a prescribed shaped inserting member (not shown) is arranged in advance, and at a time of expanding operation in the mold pattern of the above mentioned pre-expanded beads of a polyolefin resin 8, this inserting member may be melt united to one piece with the cellular molded article in the mold pattern of a polyolefin resin 2.

Figure 3:
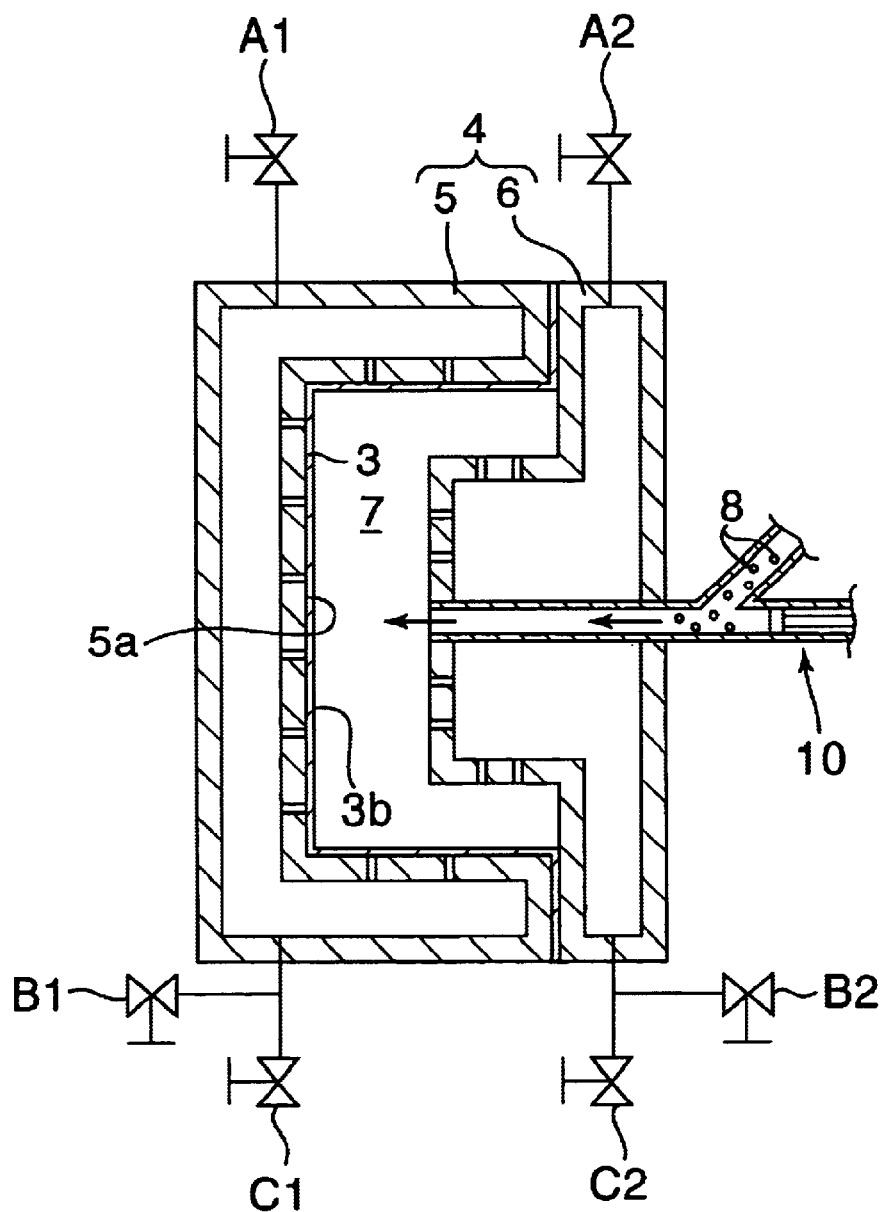
FIG. 3 illustrates a sectional side explanation view in which a state of feeding pre-expanded beads of a polyolefin resin into a mold pattern is shown.

Next, as illustrated in FIG. 3, pre-expanded beads of a polyolefin resin 8 are fed into mold pattern 7 from the above mentioned feeder 10.

At this stage, as TPO surface skin material 3 is arranged on surface 5a of the above mentioned one metal mold 5 in a condition of clamped, the inside air can be evacuated by only steam holes 6c of the above mentioned other metal mold 6, consequently, to make a smooth feeding of the above mentioned pre-expanded beads of a polyolefin resin 8, a small opening between the two metal molds may be made so that these pre-expanded beads of a polyolefin resin 8 will not go through, but the inside air can be evacuated from this small opening at a time of the feeding.

And, the above mentioned pre-expanded beads of a polyolefin resin 8 may be fed into the above mentioned mold pattern 7 in a state that a compressed gas is penetrated into their insides in advance and an inner pressure in each of them is given, or may be fed in a compressed state by a compressed gas, or may be fed as they are without giving an inside pressure or compressing.

Figure 4:
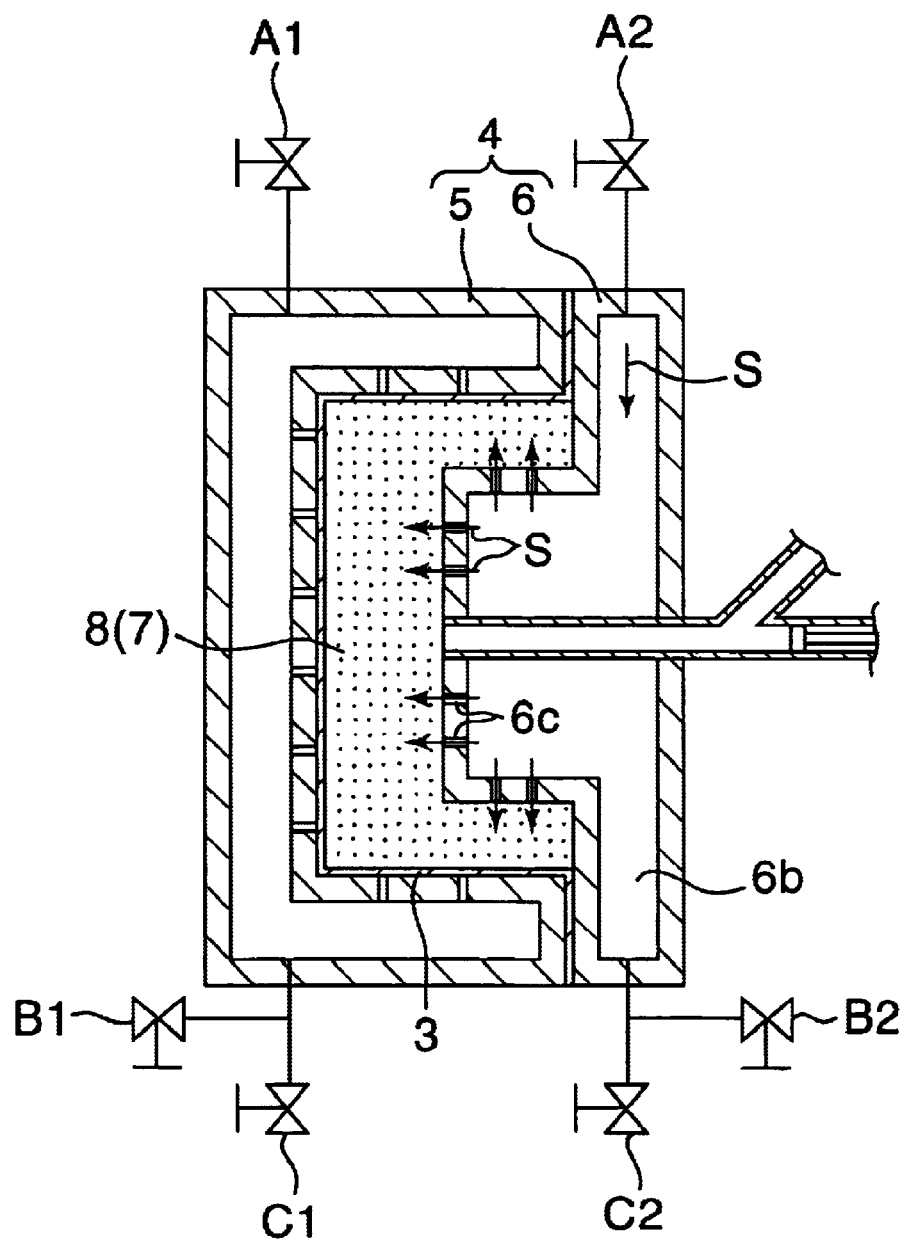
FIG. 4 illustrates a sectional side explanation view in which, after feeding pre-expanded beads of a polyolefin resin, a state of feeding steam into a mold pattern is shown.

Thereafter, as illustrated in FIG. 4, a steam valve A2, which connects with chamber 6b of the above mentioned other metal mold 6, is opened, and steam S is fed into mold pattern 7 through the above mentioned steam holes 6c, and the above mentioned pre-expanded beads of a polyolefin resin B are heat expanded.

At this stage, by means that the above mentioned pre-expanded beads of a polyolefin resin 8 are pre-heated in advance at a lower temperature than the temperature of their melt uniting together, before the regular heating of these pre-expanded beads of a polyolefin resin 8 at a higher temperature than the temperature of their melt uniting together, pre-expanded beads of a polyolefin resin 8 can be made to a sufficiently heated up to a state without causing a problem of melt uniting each other.

Furthermore, after a pre-heating as in the above, by steaming the above mentioned pre-expanded beads of a polyolefin resin 8 with steam S, as can be effectively utilizing the latent heat of fed steam S in between the above mentioned pre-expanded beads of a polyolefin resin 8, particularly, in a case of forming a thick cellular molded article in the mold pattern of a polyolefin resin 2 or the like, there is a merit that the above mentioned pre-expanded beads of a polyolefin resin 8 can be more uniformly heated.

And, after the pre-heating, steaming can be made by continuous steam S supply, or by suspending steam S supply, or, if necessary, in a condition of opening drain valve C2.

After steaming of the above mentioned pre-expanded beads of a polyolefin resin 8 by steam S, there remains drain (moisture) in between the above mentioned pre-expanded beads of a polyolefin resin 8, and if a regular heating is made as they are, there will happen insufficient melt uniting of pre-expanded beads of a polyolefin resin 8 each other. Therefore, evacuation of the above mentioned drain is desirable.

Figure 5:
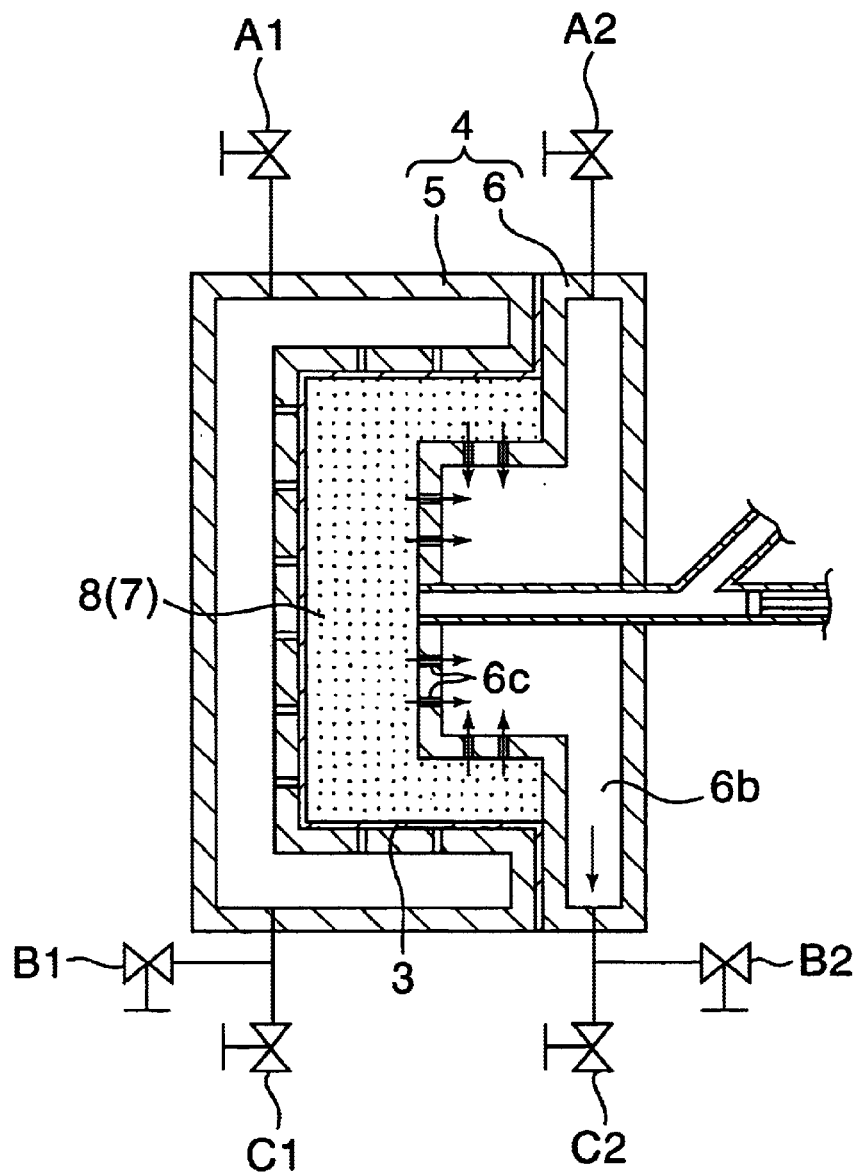
FIG. 5 illustrates a sectional side explanation view in which a state of vacuuming inside of a mold pattern is shown.

As a method for evacuation of this drain, for example, as illustrated in FIG. 5, a method that, decompression valve B2, which is connected with chamber 6b of the above mentioned other metal mold 6, is opened and vacuuming inside of mold pattern 7 through the above mentioned steam holes 6c, or a method that, making a slit between two metal molds 5 and 6 by making a small opening in the mold pattern 4, then a high temperature and dry air, which is however not so high as melt uniting temperature of pre-expanded beads of polyolefin resin 8, is penetrated therein so as to evacuate the drain through the above mentioned slit, can be mentioned among others.

Figure 6:
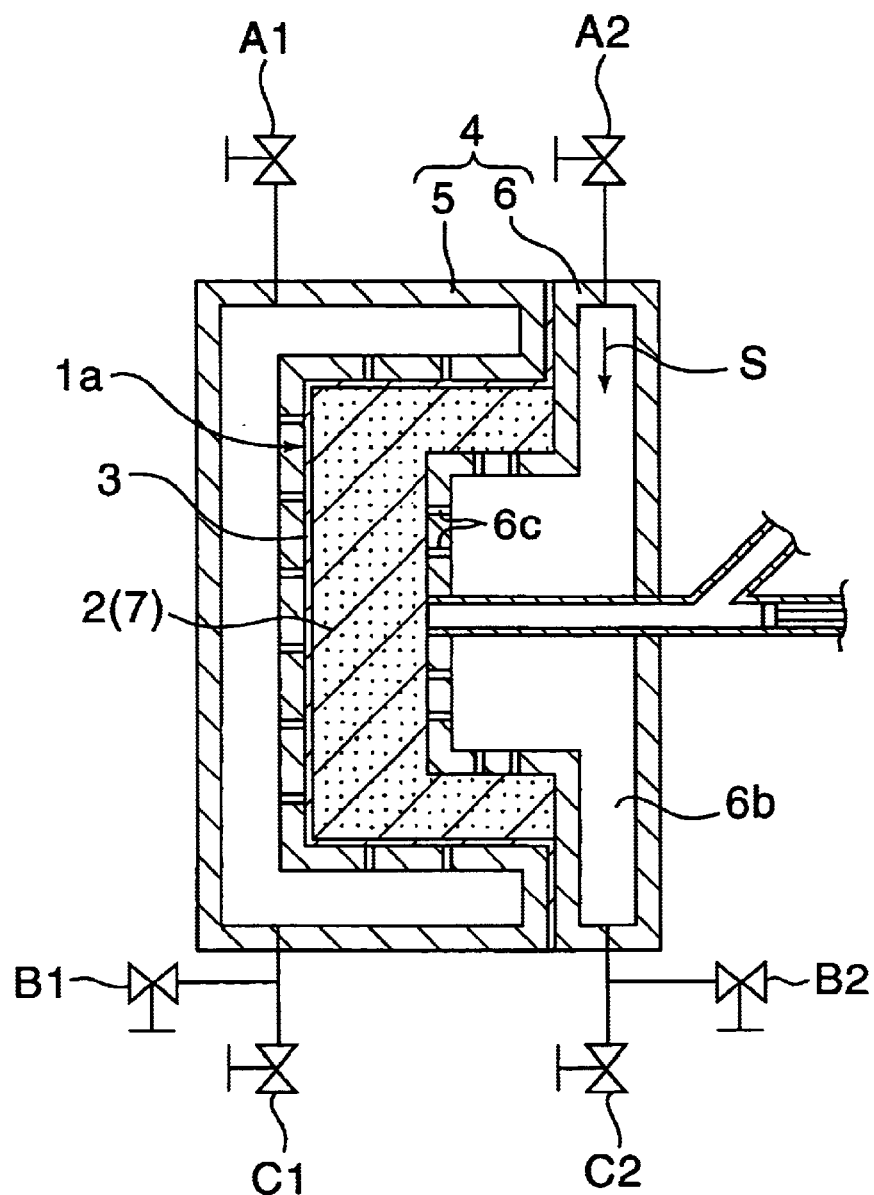
FIG. 6 illustrates a sectional side explanation view in which a state of feeding steam into a mold pattern and expanding pre-expanded beads of a polyolefin resin are shown.

Subsequently, the regular heating is carried out at a higher temperature than the temperature of melt uniting each other of the above mentioned pre-expanded beads of a polyolefin resin 8. This regular heating is carried out, as illustrated in FIG. 6, by supplying steam S into mold pattern 7 from the above mentioned steam holes 6 by opening the above mentioned steam valve A2. At this step, as described in the above, in a case that, after the steaming by steam S, vacuuming of the above mentioned mold pattern 7 is carried out for evacuation of the drain, the above mentioned steam S for the regular heating can be supplied more smoothly into mold pattern 7.

In addition, the temperature of steam S at this stage is preferably higher than the temperature at which the above mentioned pre-expanded beads of a polyolefin resin 8 are melt uniting each other. However, in a case of excessively high temperature, shrinkage of obtained cellular molded article in the mold pattern of a polyolefin resin 2 will become excessively large.

After the regular heating as described in the above, in order to transfer the heat by steam S into the above mentioned pre-expanded beads of a polyolefin resin 8 sufficiently, it is desirable to keep in its condition.

Figure 7:
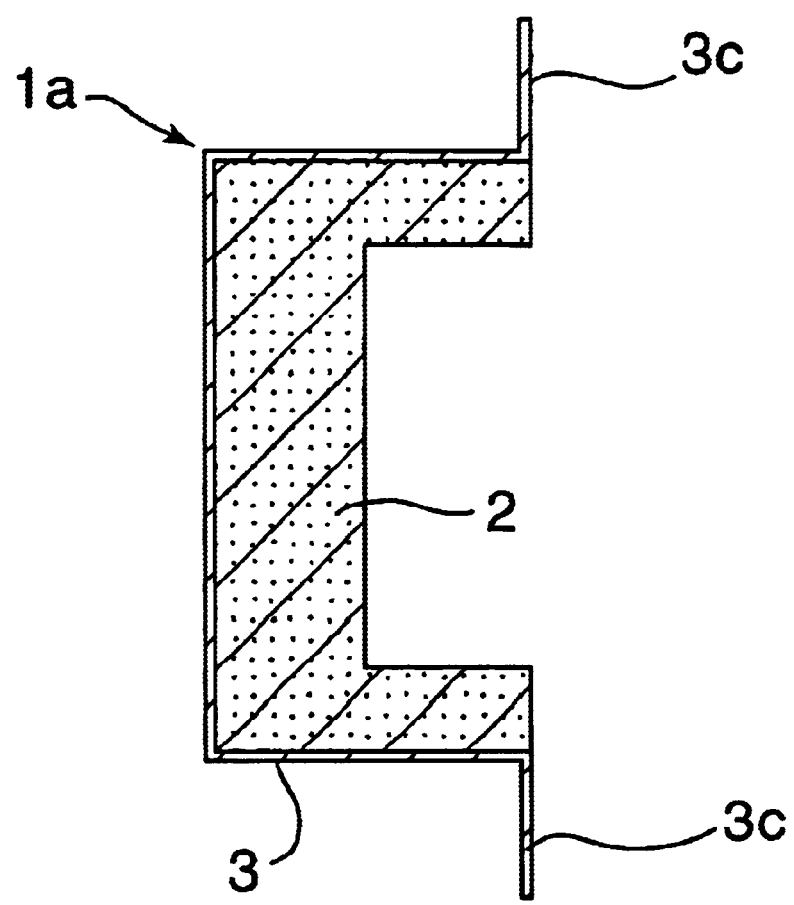
FIG. 7 illustrates a sectional side view of the cellular molded article in the mold pattern having the surface skin of a polyolefin resin, which is released from a mold pattern and thus edge part of the surface skin material is attached as it is molded.

Subsequently, by opening the above mentioned mold pattern 4, as is illustrated in FIG. 7, cellular molded article in the mold pattern having the surface skin of a polyolefin resin 1a which is having edge part 3c can be obtained.

And, before opening the mold pattern, the above mentioned mold pattern 4 may be cooled down in advance. Also, cellular molded article in the mold pattern having the surface skin of a polyolefin resin 1a which has been obtained is preferably dried by such as keeping it in a dried room, right after released it from mold pattern 4. While, as is described in this embodiment, in a case that the above mentioned edge part 3c is formed by an excessive edge part of the above mentioned TPO surface skin material 3, after releasing it from the mold pattern, as is described in the above, after drying it or before keeping it in a drying room, by cutting off the above mentioned edge part 3c, cellular molded article in the mold pattern having the surface skin of a polyolefin resin 1, which is illustrated in FIG. 1, can be obtained.

As is described in the above, the above mentioned pre-expanded beads of a polyolefin resin 8 is pre-heated and steamed by steam S, and then, by making a regular heating, when cellular molded article in the mold pattern of a polyolefin resin 2 is produced from pre-expanded beads of a polyolefin resin 8, simultaneously said cellular molded article in the mold pattern of polyolefin resin 2 can be tightly melt united to one piece with the above mentioned TPO surface skin material 3, and in further, cellular molded article in the mold pattern having the surface skin of a polyolefin resin 1, in which the above mentioned cellular molded article in the mold pattern of a polyolefin resin 2 is free from insufficient melt uniting of pre-expanded beads of a polyolefin resin 8, can be produced.

Figure 8:
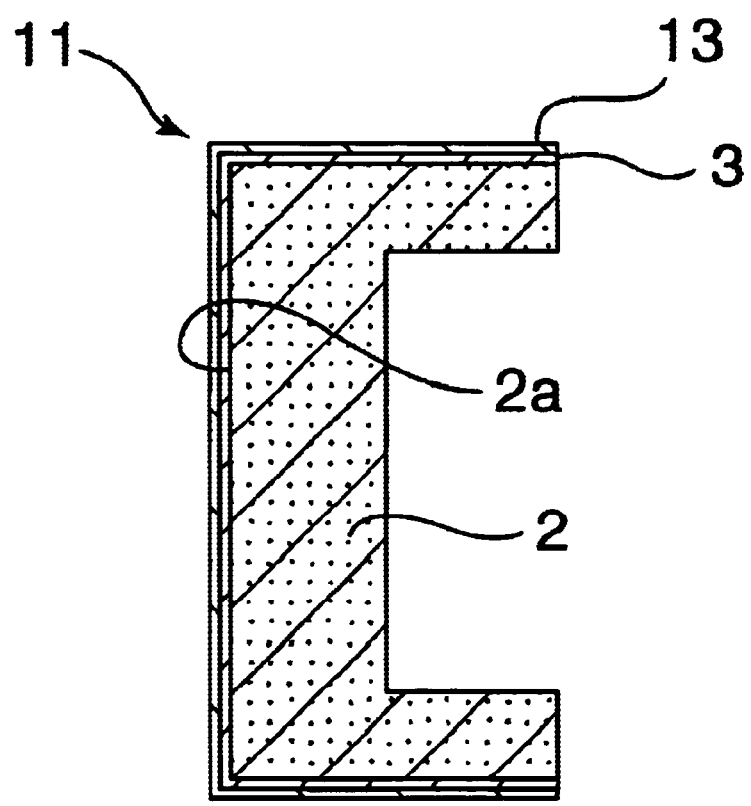
FIG. 8 illustrates a sectional side view of the cellular molded article in the mold pattern having the surface skin of a polyolefin resin, in which a dual layer surface skin material is employed.

Cellular molded article in the mold pattern having the surface skin of a polyolefin resin 11 illustrated in FIG. 8 is an example that, on surface 3a of the above mentioned TPO surface skin material 3, thermoplastic surface skin material for outer layer 13 of one layer is laminated.

When such laminated TPO surface skin material 3 with at least one layer of thermoplastic surface skin material for outer layer 13 is melt uniting to one piece with the above mentioned cellular molded article in the mold pattern of a polyolefin resin 2, as TPO surface skin material 3 is hidden by the above mentioned thermoplastic surface skin material for outer layer 13, by means of employing thermoplastic surface skin material for outer layer 13 which comprises a material which will not stick with the one metal mold 5, or in further, has a better printing property for the design so that a better appearance can be made, accordingly, there will not need to consider about a sticking problem of TPO surface skin material 3 with the one metal mold 5 nor about its appearance problem, and therefore, there is a merit that this TPO surface skin material 3 can be made from a desirable composition in consideration of a better melt uniting property with pre-expanded beads of a polyolefin resin, a better vacuum forming property or like that.

Furthermore, in the above embodiment 1 and 2 which are illustrated in FIG. 7 and FIG. 8, it was described of a case that the above mentioned one metal mold 5 is a concave mold (female mold) of which sectional side view is concave shape, however, it is not limited to this, but it can also be made that the above mentioned one metal mold is a convex mold (male mold) and the other metal mold 6 is a concave mold (female mold).

As an use of the cellular molded article in the mold pattern having the surface skin by the present invention, various industrial products such as sports goods field or parts for building and housing can be mentioned. As the interior trim material for an automobile, an instrument panel, console box, arm rest, head rest, door trim, rear panel, pillar trim, sun visor, trunk room trim, trunk lid trim, head r, globe box and ceiling material can be mentioned among others.

EXAMPLE

Next, more details of the present invention will be described by examples of the invention however, it is not limited to these examples.

Example 1 to 3

In a female mold and a male mold which compose a mold pattern, after arranging a surface skin material on the above mentioned female mold by vacuum forming, an expansion molding in this mold pattern was carried out. In inside of a portion on which a cavity face of the above mentioned female mold is composed, a flow for passing a thermo-medium is formed in meandering shape, and by means of passing steam through this flow, the temperature of cavity face is kept as shown in Table 1. And, on the above mentioned male mold, steam holes for feeding steam into the mold pattern at a time of expansion molding and a feeder for supplying pre-expanded beads were mounted.

In this stage, a thermoplastic resin sheet of polyolefine resin (TPO sheet) as the above mentioned surface skin material was employed, and after heating this sheet, it was arranged on the above mentioned female mold, then it was shaped by a vacuum pump. As pre-expanded beads, Eperan PP (trade name, produced by Kanegafuchi Chemical Industry Co., expansion rate was 15 times, its inner pressure was 2 kg/cm$^2$.G given by air pressure in a pressure container in advance) was employed, and after clamping the mold pattern, these pre-expanded beads were fed into the mold pattern through the above mentioned feeder.

After the feeding of pre-expanded beads, steam (vapor pressure was 1.5 kg/cm$^2$ G) was fed into the mold pattern through the steam holes mounted on the above mentioned male mold, and pre-heated. Then, after steaming of the pre-expanded beads, the drain and steam were suctioned and evacuated by employing a vacuum pump. Thereafter, steam (vapor pressure was 3.2 to 3.7 kg/cm$^2$.G) was fed into the mold pattern again through the above mentioned steam holes and a regular heating was carried out, and then, after cooled down by water, by opening the mold pattern, the cellular molded article in the mold pattern having the surface skin was obtained. While, cooling of the female mold during the above mentioned water cooling time was carried out by feeding a cooled water into the above mentioned flow line.

Comparative Example 1 to 2

The cellular molded article in the mold pattern having the surface skin was obtained by the same manner as in example 1 to 3 except employing the surface skin material shown in Table 1.

Comparative Example 3 to 6

The surface temperature of female mold pattern was changed as shown in Table 1, and comparative example 4 shows the result in which Pef PPAM (trade name of Toray company) was employed as the surface skin material.

In addition, at a time of opening the mold pattern in example 1 to 3 and comparative example 1 to 6, a presence of sticking of the surface skin material with the female mold pattern was observed. Also, a surface appearance of each of the obtained cellular molded article in the mold pattern having the surface skin was examined. Its result is shown in Table 1.

[Evaluation Standard]

Presence of sticking of the surface skin material with the female mold pattern;

◎: none of presence of sticking with the metal mold
○: some presence of sticking with the metal mold, but it can be released without trouble
▲ presence of sticking with the metal mold is observed and automatic releasing from the metal mold is difficult
×: strong sticking with the metal mold and cannot be released from the metal mold Printing property of the design to the molded article;

◎: design of the metal mold is sufficiently printed on
○: design of the metal mold is almost printed on
▲: design of the metal mold is printed on, but defect is observed
×: design of the metal mold is not sufficiently printed on Melt uniting property of the beads with the surface skin material ◎: beads are tightly melt united with the surface skin material
○: beads are melt united with the surface skin material
▲: beads are melt united with the surface skin material but not tightly
×: beads are not sufficiently united with the surface skin material

TABLE 1

| | Composition of surface skin material | | Surface temperature of female mold (° C.) | | Sticking of surface skin material to female mold pattern | Printing property of design | Melt uniting property of beads with surface skin |
|---|---|---|---|---|---|---|---|
| | Domain | Matrix | Vacuum forming | Expansion molding | | | |
| Example 1 | TPO-a EPDM B-PP | R-PP (a) | 95 | 100 | ◎ | ◎ | ◎ |
| Example 2 | TPO-b EPDM R-PP | R-PP (a) | 90 | 90 | ○ | ○~◎ | ◎ |
| Example 3 | TPO-c EPDM LLDPE | R-PP (a) | 95 | 95 | ◎ | ◎ | ◎ |
| Comparative example 1 | TPO-a EPDM B-PP | LLDPE | 100 | 95 | × | ▲~○ | ◎ |
| Comparative example 2 | TPO-a EPDM R-PP | R-PP (a) LLDPE | 95 | 95 | ▲ | ▲~○ | ◎ |
| Comparative example 3 | TPO-a EPDM B-PP | R-PP LLDPE | 50 | 50 | ◎ | ▲~× | × |
| Comparative example 4(*1) | TPO-a EPDM B-PP | R-PP LLDPE | 50 | 50 | ◎ | ▲~× | ◎ |
| Comparative example 5 | TPO-a EPDM B-PP | R-PP LLDPE | 50 | 95 | × | ▲~× | ◎ |
| Comparative example 6 | TPO-a EPDM B-PP | R-PP LLDPE | 95 | 50 | ▲~× | ▲~○ | × |

In the above Table 1, it is shown that:

TPO-a: WT312B, trade name, made by Sumitomo Chemical Industry
TPO-b: 4652, trade name, made by Sumitomo Chemical Industry
TPO-c: 8030N, trade name, made by Mitsui Petroleum Chemical Co
R-PP(a): S-131, trade name, made by Sumitomo Chemical Industry
LLDPE: FW201-O, trade name, made by Sumitomo Chemical Industry
*1: Pef PPAM 15025, trade name, made by Toray Co.

EFFECTIVENESS OF THE INVENTION

A producing method for the cellular molded article in the mold pattern having the surface skin and a molded article thereby which are relating to the present invention exhibit an excellent effect in printing of a design of metal mold onto a surface skin material, and an excellent automatic releasing property from a mold metal. Accordingly, there are a lot of advantageous effects such as a good appearance, easy recycling or light weight.

Although the invention has been described in its preferred form with certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A producing method of a cellular molded article in a mold pattern having a surface skin is that, after thermoforming of a surface skin material along by a metal mold face of either one of two metal molds which compose a mold pattern, by means of expansion molding in this mold pattern, the above mentioned surface skin material is melt united to one piece with a surface of cellular molded article in the mold pattern to be molded, wherein at least a face of the above mentioned surface skin material, which contacts with a metal mold, is an olefin thermoplastic elastomer sheet which has a domain which contains a polyethylene as its composing raw material resin and is formed by dynamic curing, and a matrix which is composed of an olefin resin without containing a polyethylene, and wherein pre-expanded beads, which are employed for an expansion molding in the mold pattern, are pre-expanded beads of an olefin resin.

2. A producing method of the cellular molded article in the mold pattern having the surface skin as claim in claim 1, wherein on the surface of the above mentioned surface skin material, a coating material for scratch protection is coated.

3. A producing method of the cellular molded article in the mold pattern having the surface skin as claimed in claim 1, wherein the above mentioned pre-expanded beads are pre-expanded beads of a polypropylene.

4. A producing method of the cellular molded article in the mold pattern having the surface skin as claimed in claim 1, wherein the above mentioned pre-expanded beads of an olefin resin are pre-expanded beads of a polyethylene.

5. A producing method of the cellular molded article in the mold pattern having the surface skin as claimed in claim 1, wherein the above mentioned olefin resin which comprises a matrix is a polypropylene.

6. A producing method of the cellular molded article in the mold pattern having the surface skin as claimed in claim 1, wherein the above mentioned polyethylene which is not included in a matrix is a linear low density polyethylene.

7. A producing method of the cellular molded article in the mold pattern having the surface skin as claimed in claim 1, wherein at least the one metal mold is composed of an aluminum.

8. A producing method of the cellular molded article in the mold pattern having the surface skin as claimed in claim 1, wherein on the surface of the above mentioned one metal mold, a design pattern, which will be printed on a sheet at a time of thermal forming of the sheet, is attached.

* * * * *